United States Patent Office 3,316,173
Patented Apr. 25, 1967

3,316,173
PROCESS FOR TREATING WATER
WITH BROMINE
Jack F. Mills, Robert D. Goodenough, and William F. Nekervis, all of Midland, Mich., assignors to The Dow Chemical Company, Midland, Mich., a corporation of Delaware
No Drawing. Continuation of application Ser. No. 283,596, May 27, 1963. This application June 1, 1966, Ser. No. 537,246
5 Claims. (Cl. 210—62)

This application is a continuation of Ser. No. 283,596, filed May 27, 1963, now abandoned.

This invention relates to a process for treating an aqueous solution with bromine to control the microorganisms therein. More particularly, it relates to a process for treating water with elemental bromine obtained from the polybromide form of an anion exchange resin.

The use of chlorine and bromine in the disinfection and sterilization of water supplies for many diverse purposes is well known. Chlorination of municipal water supplies has been a standard practice in the United States and abroad for many years. Addition of bromine in concentrations up to 5 parts per million (p.p.m.) to sanitize water was described by Henderson in United States Patent 1,995,639. Now it is generally recognized that on an equimolar basis, bromine is several times more effective than chlorine for the control of bacteria, algae, slime, and other microorganisms in water supplies. In fact, excellent control of many bacteria in water can be effected using as little as 0.1 p.p.m. bromine.

With badly contaminated water, a heavy initial shock treatment with from 3 to 30 p.p.m. bromine may be desirable to kill the contaminating microorganisms after which a residual bromine concentration of 0.1 to 1.0 p.p.m. is generally effective in maintaining sanitary water. The level of the shock treatment is, of course, dependent on the nature of the contaminating microorganisms. For treatment of potable water, shock treatment with 3 to 5 p.p.m. bromine generally suffices to kill the undesired bacteria. However, heavy contamination with slime and algae, as may be encountered in water used in industrial cooling towers, often requires shock treatment with 10 to 30 p.p.m. of bromine. For example, while treatment with 2 p.p.m. bromine noticeably inhibits the growth of Chlorella, a common strain of algae, 10 p.p.m. bromine are required for pronounced inhibition and between 10–20 p.p.m. for complete kill.

In addition to its effectiveness as an antimicrobial, there are further advantages to the use of bromine in sanitizing water supplies. Because of its lower volatility, maintaining a desired residual level of halogen in the treated water is easier with bromine than chlorine, particularly under conditions of turbulent flow and agitation. Furthermore, bromine imparts little or no undesirable taste or odor to the treated water. Indeed, since bromine acts to destroy suspended or dissolved organic matter which often causes undesirable color and odor, it is particularly suited for use as a sanitizing agent for swimming pools where sparkling clear, colorless and odorless water is highly desirable.

Thus, treating water with bromine is advantageous in providing large volumes of water suitable as potable municipaly supplies and for many other commercial, industrial and residential purposes. In particular, bromine is extremely desirable for use as a sanitizing agent for swimming pools, industrial cooling towers, and similar recirculating water systems since a very low concentration of bromine is effective both in destroying the bacteria initially present and in maintaining hygienic conditions in spite of repeated recontamination.

However, because of the highly corrosive nature of elemental bromine, a serious hazard is involved in its use. The danger in handling liquid bromine has discouraged its use as a sanitizing agent, particularly in smaller systems where elaborate equipment for handling liquid bromine is not feasible. In some localities use of liquid bromine has been restricted by ordinance.

Thus, there exists a need for a safe and practical process whereby bromine can be stored, handled, and added to water by unskilled personnel. Such a process requires a form of bromine which is easily and safely prepared, which is stable during storage and shipment, which does not cause serious burns in case of accidental skin contact, and yet which releases elemental bromine as required for sanitizing treatment.

It has now been discovered that the polybromide form of strongly basic, quaternary ammonium anion exchange resins is an extremely convenient, effective, and safe means for handling elemental bromine for use in treating water to control microorganisms. Essentially the polybromide resin serves as a reservoir from which elemental bromine can be removed as required to establish or to maintain control of bacteria, algae, slime, and other microorganisms in a body of water. Not only do such polybromide resins possess highly useful and desired properties in respect to both bromine loading and elution characteristics, but also such polybromide resins are chemically stable for prolonged periods under normal storage conditions and can be prepared, stored, and shipped safely without degradation in quality. Although definitely not recommended, momentary accidental contact of the polybromide resin even with wet skin will not cause burns. Furthermore, the aqueous solution obtained by contact of the polybromide resin with water is sufficiently dilute so that burns will not result from brief skin contact.

Thus, the invention described herein concerns an improved process for treating water with bromine. More particularly, this improved process comprises: (1) contacting an anion exchange resin in polybromide form with water whereby bromine is removed from the polybromide resin to give an aqueous solution containing from 10 to 10,000 p.p.m. bromine and (2) mixing a sufficient amount of said aqueous bromine solution with the water to be treated to establish therein a concentration in the range from about 0.02 to 30.0 p.p.m. bromine.

The adsorption of elemental bromine by an anion exchange resin was reported in Chem. and Ind., 1238 (1957) by Aveston and Everest who found that when an anion exchange resin was treated with an aqueous solution containing elemental bromine, the polybromide anion, $Br_n^-$ wherein $n$ is 3, 5 or 7, became the predominant anionic species in the resin phase. With a quaternary ammonium resin and excess bromine, the resin was converted to the $Br_7^-$ form by adsorption of 3 moles of bromie per equivalent of resin.

Ziegler in Angew. Chemie, 71, 283 (1959) reported that the polybromide resin was stable for a period at least 1.5 years. Furthermore, Ziegler found that the bromine was quantitatively eluted from the resin as bromide ion by treatment of the polybromide resin with an aqueous solution of a reducing agent, such as sulfur dioxide or sodium bisulfite. However, elution of bromine from the polybromide resin as an aqueous solution containing from 10 to 10,000 p.p.m. of elemental bromine as described herein has not been previously reported.

In the practice of the present invention, commercial anion exchange resins prepared by the reaction of a chloromethylated styrene-divinylbenzene resin with an appropriate organic amine are suitable as bromine carriers. Strongly basic, quaternary ammonium anion exchange resins of the type described by McBurney in United States Patent 2,591,573 and by Bauman and McKellar in United States Patent 2,614,099 are particularly desirable. Weakly basic polyamine anion exchange resin, such as described by McBurney in United States Patent 2,591,574, may also be employed although the polyhalide form of these resins is not as stable.

Since the operating characteristics of the polybromide anion exchange resin column are similar to those of conventional ion exchange resin columns, commercial resins and conventional operating techniques are generally satisfactory in terms of such factors as degree of resin cross-linking, mesh size, flow rates, etc. While commercial anion exchange resins are commonly available in the chloride form, any anionic form may be employed so long as the anionic component is exchangeable by bromide or polybromide ions. Hydrolysis of bromine in the aqueous solution used to prepare the polybromide resin is generally sufficient to convert the resin to the desired bromide form. However, conversion from one anionic form to another is readily accomplished by well-known ion exchange techniques if necessary.

A particularly effective method for the preparation of a suitable polybromide resin is to pass an essentially saturated solution of bromine in aqueous sodium bromide slowly up through a bed of quaternary ammonium anion exchange resin. In this manner a commercial resin having a dry weight capacity of 3.50 meq./g., Cl$^-$ form, rapidly adsorbed 3 moles of bromine per equivalent of quaternary ammonium groups. The resulting polybromide resin in wet form contained about 48.6 weight percent bromine. This adsorbed bromine was quantitatively removed by treatment with a sodium bisulfite solution. An attempt to load the resin further under more forcing conditions resulted in bromination of the resin matrix, the elutable bromine content remaining at about 3 moles per equivalent of resin. A cubic foot of wet quaternary ammonium resin in the $Br_7^-$ form contains about 40 pounds of bromine, an amount sufficient to treat a 25,000 gal. swimming pool for a normal period of at least 30 days.

If the polybromide resin is dried or exposed to large volumes of air, some of the adsorbed bromine is lost. However, if stored in a sealed container of bromine-resistant material such as polyvinyl chloride, the resin is stable for prolonged periods.

With conventional flow rates of from 1 to 10 g.p.m./ft.$^2$ of resin bed cross-sectional area, elution of bromine from the polybromide resin by passing water through the resin bed is essentially independent of the exact method of contact. An equilibrium is rapidly established between the bromine adsorbed by the anion exchange resin and that present in the aqueous phase. At room temperature the aqueous phase in contact with a quaternary ammonium resin in a fully loaded $Br_7^-$ form contained about 7,000 p.p.m. bromine. Elution studies with a column of this resin indicated that the bromine concentration in the eluent dropped to about 1,300 p.p.m. after 100 bed volumes of water passed through the column. After passage of 1,400 bed volumes, the bromine concentration in the eluent dropped to about 50 p.p.m. and about 95 percent of the adsorbed bromine had been removed. Further elution reduced the residual bromine content of the resin still lower and the eluent bromine concentration then dropped to 10 p.p.m. and less.

Temperature does have a marked effect on the equilibrium of bromine between the resin and aqueous phases. For example, water in contact with an approximately equivalent amount of polybromide resin containing 2.14 moles of bromine per equivalent of resin had an equilibrium concentration of about 13,800 p.p.m. bromine at 55° C. and 4,270 p.p.m. at 27° C.

Regeneration of the exhausted or partially exhausted polybromide resin is readily achieved by treatment with a more concentrated bromine solution whenever desired, generally when the concentration of bromine in the eluent falls below a given level. Yet obviously a higher eluent concentration of bromine is needed for a shock treatment requiring 10–30 p.p.m. bromine in the treated water than for maintaining a residual of 0.02–1.0 p.p.m. bromine. Hence, the frequency of regeneration will depend on the requirements of the particular system.

The bromine-containing eluent solution can be metered and added to another body of water as required to establish or to maintain a desired bromine concentration in the treated water. Conventional analytical techniques can be employed to determine bromine concentrations and to control the treatment process. If desired, automatic equipment can be used to monitor continually the bromine concentration in the treated water and to add the more concentrated bromine eluate as required to maintain the bromine concentration within desired limits. Such control is particularly suitable with a recirculating system such as commonly employed in residential swimming pools where a portion of the water circulating through the system can be diverted by suitable means to pass through and to elute bromine from a polybromide resin column.

The following examples illustrate further the invention described herein but are not to be construed as limiting its scope.

*Example 1.—Polybromide resins*

A. A portion of 20/50 mesh commercial quaternary ammonium styrene-divinylbenzene anion exchange resin having a dry weight capacity of 3.5 meq./g. Cl$^-$ form (Dowex 1-X8 resin) was placed in a 1″ I.D. glass column and loaded with bromine by slowly passing an excess of an aqueous solution containing about 35 wt. percent bromine and 17 wt. percent sodium bromide up through the column. After complete loading, the excess bromine solution was drained from the column and the polybromide resin rinsed with a small amount of water. A sample of the resulting wet polybromide resin was found to contain 48.6 wt. percent bromine. The adsorbed bromine was quantitatively removed by treatment of the resin with a sodium sulfite solution and corresponded to a theoretical capacity of 3 moles of bromine/equivalent of resin anion exchange capacity.

B. In an attempt to load the resin further, the concentrated aqueous bromine solution was warmed to 50° C. and recycled through the resin bed for several hours. The resin was then allowed to stand at room temperature for several days in contact with the bromine solution. The resulting wet resin was found to contain 64.9 wt. percent total bromine. However, after treating this resin with excess sodium sulfite solution, it retained 16.4 wt. percent bromine indicating bromination of the resin matrix. The elutable bromine was equivalent to about 3 moles of bromine per equivalent of initial resin capacity.

C. In a similar manner the polybromide forms of other styrene-divinylbenzene resin containing from 1 to 16% divinylbenzene were prepared. Also, a quaternary poly(vinylpyridine) resin as described by Greer in United States Patent 2,801,223 and a commercial quaternized polyethoxypolyamine resin were converted to similar polybromide forms. Although the bromine capacities of these resins were similar in proportion to their initial anion exchange capacity, the latter two resins were less stable than the preferred quaternary ammonium styrene-divinylbenzene resins.

*Example 2.—Elution characteristics*

Using a 1″ I.D. column filled with the polybromide form of Dowex 1-X8 resin prepared as described in Example 1A, a series of elution runs was made at room temperature. No appreciable variation in elution characteristics was found using flow rates of 5 and 10 g.p.m./ft.$^2$, a bed depth of 18 and 36 inches, and upflow and downflow feed. Table I presents data from a typical elution run using a wet resin containing initially 48.5 wt. percent bromine.

TABLE I.—ELUTION CHARACTERISTICS

| Bed Volumes of Eluent | 10 | 50 | 100 | 300 | 600 | 1,400 |
|---|---|---|---|---|---|---|
| Br₂ in eluent, p.p.m. | 7,000 | 3,000 | 1,300 | 350 | 150 | 50 |
| Total Br₂ eluted, percent | 9.9 | 30.0 | 55.2 | 74.8 | 85.5 | 95.4 |

*Example 3.—Swimming pool unit*

A small resin column, 4″ in diameter and 18″ high, loaded with 0.13 ft.³ of Dowex 1–X8 resin in the polybromide form and containing about 5.2 lbs. of bromine, was installed in the recycle line of a 20,000 gallon outdoor residential pool. By means of appropriate valves, a portion of the recycle water could be diverted after the filter unit to pass through the resin column, thereby eluting a portion of the adsorbed bromine for addition to the main recycle stream.

Initially flow of recycle water through the resin column was controlled manually to maintain a bromine concentration in the main body of the pool between about 0.70 and 1.20 p.p.m. Subsequently an automatic instrument was installed to measure the residual bromine in the recycle stream and to control a solenoid valve on the line to the polybromide column thereby diverting a portion of the recycle stream through the polybromide resin column intermittently as required to maintain a desired bromine concentration. For example, in a warm mid-afternoon period, the resin column was used with a cycle of about 10 minutes on-stream followed by about 20 minutes off-stream. After each on-stream period, the bromine concentration in the pool continued to rise for a few minutes because of the pool mixing characteristics before dropping slowly as the bromine was consumed. Nonetheless the bromine concentration in the pool was easily maintained between about 0.80 to 1.05 p.p.m. During the night, bromine consumption was essentially nil.

During an extended test period with the polybromide resin column, the swimming pool showed no signs of algae growth and maintained an essentially sterile condition with a bacterial plate count of less than 0.1 per cc.

We claim:

1. In a process for treating an aqueous solution with bromine, the improvement which comprises:
   passing the aqueous solution through a bed of a water-insoluble anion exchange resin in polybromide form, whereby bromine is removed from the polybromide resin by the aqueous solution.

2. In a process for treating an aqueous solution with bromine to control the microorganisms therein, the improvement which comprises:
   (1) contacting a water-insoluble anion exchange resin in polybromide form with an aqueous solution whereby bromine is removed from the polybromide resin to give an aqueous solution containing from 10 to 10,000 p.p.m. bromine and
   (2) mixing a sufficient amount of said bromine solution with the aqueous solution to be treated to establish therein a concentration in the range from about 0.02 to 30.0 p.p.m. bromine.

3. The process of claim 2 wherein a portion of the aqueous solution to be treated is used to remove bromine from the polybromide resin.

4. The process of claim 2 wherein the water-insoluble anion exchange resin is a quaternary ammonium anion exchange resin.

5. The process of claim 4 wherein the predominate anionic species in the resin phase prior to initial elution is the polybromide anion, $Br_n^-$, wherein $n$ is an odd integer from 3 to 7 inclusive.

References Cited by the Examiner

UNITED STATES PATENTS

| 3,037,845 | 6/1962 | Hein | 23—154 |
| 3,075,830 | 1/1963 | Schoenbeck | 23—216 |
| 3,098,716 | 7/1963 | Gradishar et al. | 23—217 |
| 3,101,250 | 8/1963 | Schoenbeck | 23—87 |
| 3,116,976 | 1/1964 | Gradishar et al. | 23—216 |
| 3,140,976 | 7/1964 | Berenschot et al. | 210—64 |
| 3,152,073 | 10/1964 | Morton | 210—62 |

References Cited by the Applicant

UNITED STATES PATENTS 3,174,828  3/1965  Hein.

FOREIGN PATENTS 1,013,391  12/1965  Great Britain.

MORRIS O. WOLK, *Primary Examiner.*

E. G. WHITBY, *Assistant Examiner.*